(12) United States Patent
Hashimoto

(10) Patent No.: US 8,583,310 B2
(45) Date of Patent: Nov. 12, 2013

(54) ELECTRIC VEHICLE

(71) Applicant: Hironobu Hashimoto, Toyota (JP)

(72) Inventor: Hironobu Hashimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/670,076

(22) Filed: Nov. 6, 2012

(65) Prior Publication Data

US 2013/0116871 A1 May 9, 2013

(30) Foreign Application Priority Data

Nov. 8, 2011 (JP) .................................. 2011-244085

(51) Int. Cl.
*B60W 20/00* (2006.01)
*B60W 10/08* (2006.01)

(52) U.S. Cl.
USPC ......................................... 701/22; 180/65.21

(58) Field of Classification Search
None
See application file for complete search history.

(56) References Cited

U.S. PATENT DOCUMENTS

| 5,994,789 A | 11/1999 | Ochiai | |
|---|---|---|---|
| 2010/0194219 A1* | 8/2010 | Hotta et al. | 310/54 |
| 2011/0114402 A1* | 5/2011 | Inoue et al. | 180/65.21 |
| 2011/0133547 A1* | 6/2011 | Song et al. | 307/9.1 |
| 2012/0169358 A1* | 7/2012 | Ono | 324/720 |
| 2012/0285757 A1* | 11/2012 | Atarashi et al. | 180/68.1 |

FOREIGN PATENT DOCUMENTS

| JP | 10-248263 A | 9/1998 |
|---|---|---|
| JP | 2003-199387 A | 7/2003 |
| JP | 2007-244070 A | 9/2007 |
| JP | 2011-026956 A | 2/2011 |

* cited by examiner

*Primary Examiner* — James Trammell
*Assistant Examiner* — Demetra Smith-Stewart
(74) *Attorney, Agent, or Firm* — Gifford, Krass, Sprinkle, Anderson & Citkowski, P.C.

(57) ABSTRACT

An electric vehicle includes a wheel-driving motor, a motor inverter that supplies electric power to the wheel-driving motor, a pump that delivers a cooling medium to at least one of the motor inverter and the motor, a capacitor that stores a counter electromotive force generated by the pump, and a pump inverter that supplies electric power to the pump to drives the pump. When a vehicle controller receives a signal indicating a collision of the vehicle, the vehicle controller stops a supply of electric power from the pump inverter to the pump and connects the pump inverter to the capacitor. The pump inverter converts AC power generated by the counter electromotive force of the pump into DC power to store the DC power in the capacitor.

4 Claims, 1 Drawing Sheet

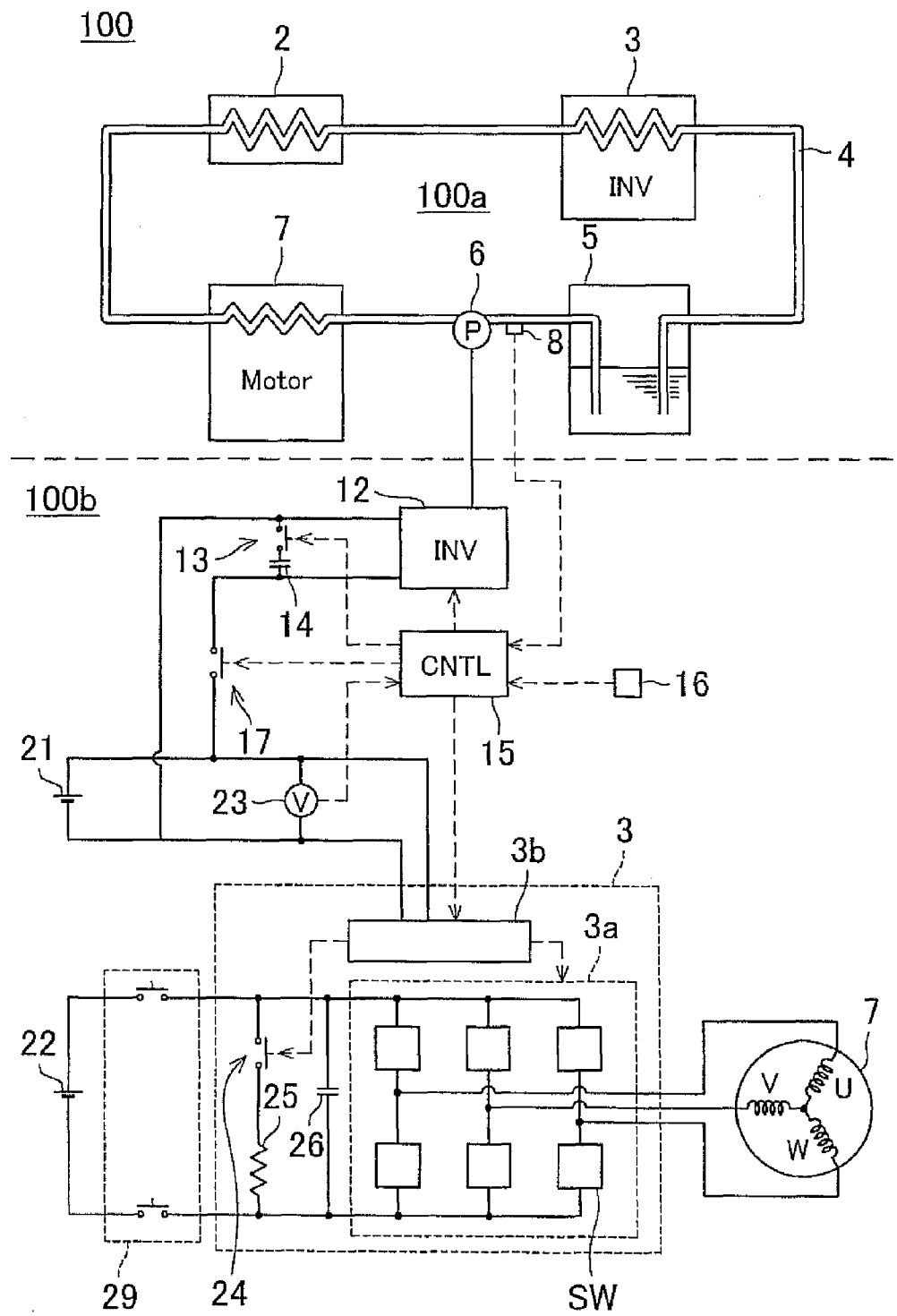

ELECTRIC VEHICLE

INCORPORATION BY REFERENCE

The disclosure of Japanese Patent Application No. 2011-244085 filed on Nov. 8, 2011 including the specification, drawings and abstract is incorporated herein by reference in its entirety.

BACKGROUND OF THE INVENTION

1. Field of the Invention

The present invention relates to an electric vehicle that includes a wheel-driving motor. The electric vehicle of the present invention also includes: a hybrid vehicle that includes a vehicle-driving motor; and an engine and a fuel-cell vehicle.

2. Description of Related Art

In contrast to engine-driven vehicles, electric vehicles include an electrical system that utilizes high currents and that includes a wheel-driving motor, a high-capacity/high-output-current battery, an inverter that converts DC power of the battery into AC power suitable for driving the motor, and so on. Thus, there are various safety measures and preventive procedures for the electrical system, which are different from those for engine-driven vehicles.

For example, the inverter includes a large-capacitance capacitor that smoothes a high current that is input from the battery or a high current that is output to the motor. Japanese Patent Application Publication No. 2003-199387 (JP 2003-199387 A) proposes a technique to discharge electric charge of a large-capacitance capacitor in an inverter when a main switch of a vehicle (a so-called ignition switch) is switched OFF. According to the technique disclosed in JP 2003-199387 A, when the main switch is switched OFF, a switching device of the inverter is appropriately driven with a battery disconnected from the inverter to discharge electric charge of the capacitor.

The inverter generates heat because it to utilize high currents. The motor also generates heat. Therefore, many of electric vehicles include a cooling system that cools the inverter and the motor. The cooling system typically uses a liquid cooling medium, and includes a pump that delivers the cooling medium to the inverter and the motor. When the main switch of the vehicle is switched OFF or when a drive system of the vehicle is suddenly stopped due to any accident (a collision, for example), a supply of electric power to the pump is also stopped. However, the pump itself continues rotating due to an inertial force of the cooling medium that has been flowing. This causes a motor of the pump (hereinafter sometimes referred to as "pump motor") to generate a counter electromotive force. If a current caused by the counter electromotive force is not dissipated anywhere, the motor of the pump can possibly be damaged. Particularly, in a case where the vehicle collides with an obstacle, if the drive system of the vehicle is suddenly stopped and the cooling system for the inverter and/or the motor is suddenly stopped, the pump motor can possibly be damaged by the counter electromotive force generated by the pump motor. Preventing the pump motor from being damage is also one of the measures specific to electric vehicles. The present invention disclosed herein has been made to solve the above problems.

SUMMARY OF THE INVENTION

An electric vehicle according to a aspect of the present invention includes a motor inverter that supplies electric power to a wheel-driving motor, a pump that delivers a cooling medium to at least one of the motor inverter and the motor, a capacitor that stores a counter electromotive force generated by the pump, a pump inverter that supplies electric power to the pump and drives the pump, and a controller that is configured to stop a supply of electric power from the pump inverter to the pump and connect the pump inverter to the capacitor when the controller receives a signal indicating a collision of the vehicle. When a cooling system is stopped suddenly for some causes, and the output shaft of the pump is driven because of an inertial force of a coolant medium and the pump generates a counter electromotive force, a current caused by the counter electromotive force is absorbed by the capacitor to prevent the pump from being damaged.

According to the electric vehicle of the aspect of present invention, a current caused by a counter electromotive force is absorbed by a capacitor to prevent a pump from being damaged.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a system diagram of an electric vehicle according to an embodiment of the present invention.

DETAILED DESCRIPTION OF EMBODIMENTS

FIG. 1 is a system diagram of an electric vehicle 100. In FIG. 1, a cooling system 100a (on the upper side of the broken line in the drawing sheet) and a drive system 100b (on the lower side of the broken line in the drawing sheet) are shown. A motor inverter 3 and a motor 7 that are shown on the cooling system 100a-side and a motor inverter 3 and a motor 7 that are shown on the drive system 100b-side are identical with each other, respectively. Broken-line arrows in FIG. 1 indicate a signal flow. A vehicle according to the present embodiment is a single-motor electric vehicle that includes one wheel-driving motor 7.

The cooling system 100a is first described. The cooling system 100a is a system that cools the motor 7 and the motor inverter 3 that supplies AC power to the motor 7. The cooling system 100a includes a cooling-medium flow path 4 through which a cooling medium is circulated between the motor 7, the motor inverter 3, a radiator 2, and a reserve tank 5. A pump 6 that delivers a cooling medium is attached to the cooling-medium flow path 4. As a cooling medium cools the motor 7 and the motor inverter 3, a temperature of the cooling medium increases. The cooling medium is then cooled by the radiator 2. The cooling medium is delivered from the pump 6 and is recirculated to the motor 7 and the motor inverter 3. A temperature sensor 8 that measures a cooling-medium temperature is attached to the cooling-medium flow path 4 adjacent to the pump 6. The cooling-medium temperature measured by the temperature sensor 8 is transmitted to a vehicle controller 15. The vehicle controller 15 adjusts the output of the pump 6 such that the cooling-medium temperature falls within a predetermined temperature range. That is, the vehicle controller 15 increases the output of the pump 6 when the cooling-medium temperature is higher than the predetermined temperature range, and decreases the output of the pump 6 when the cooling-medium temperature is within the predetermined temperature range. The vehicle controller 15 also increases the pump output when the output of the motor inverter 3 is high because a temperature of the motor inverter 3 is expected to increase later.

The pump 6 has a structure in which an impeller is attached to an output shaft of an AC motor. However, the present invention is not limited thereto. That is, any pump may be used as long as when a cooling medium supplied by the pump is circulated via the motor 7 and the motor inverter 3 back to the pump, the pump can be driven in the reverse direction by the flow of the circulated cooling medium. A pump inverter 12 converts DC power that is output from a sub battery 21 (described later) into AC power to supply the AC power to the pump 6. To be exact, the vehicle controller 15 provides an output command to the pump inverter 12.

The drive system 100b is described. The electric vehicle 100 includes two different batteries (many of electric vehicles include a high-power motor-driving battery and a battery that drives a controller, an audio system, and so on). The former battery generally has an output voltage of 100 Volt (V) or higher, while the latter battery has an output voltage lower than 100 V (typically 12 V or 24 V). The former battery may hereinafter be referred to as "main battery," while the latter battery may hereinafter be referred to as "sub battery." A circuit that drives an inverter switching circuit and a circuit that operates a discharge device are operated by electric power from the sub battery. One of those two different batteries is a main battery 22 that supplies electric power to the wheel-driving motor 7. The other battery is a sub battery 21 that drives so-called electronic devices such as a controller, an audio system, and a car navigation system. The main battery 22 has an output voltage of 300 V, while the sub battery 21 has an output voltage of 12 V.

An electrical system for the main battery 22 is first described. The main battery 22 is connected through a system main relay 29 to an AC generating circuit 3a in the motor inverter 3. The AC generating circuit 3a includes six switching circuits SW. Each of the switching circuits SW has a circuit configuration in which an insulated gate bipolar transistor (IGBT) and a diode (a freewheeling diode) are connected in inverse-parallel. A pair of the switching circuits SW are connected in series. Three pairs of the switching circuits SW are connected in parallel. A line extends from the midpoint of a pair of the switching circuits SW connected in series, and connects to the motor 7. Three lines extending from the three pairs of the switching circuits SW connected in series constitute three-phase (UVW-phase) AC lines. The motor inverter 3 includes an inverter control circuit 3b. The inverter control circuit 3b outputs a switching command (a pulse width modulation (PWM) signal) to each of the switching circuits SW. The inverter control circuit 3b is operated by receiving a supply of electric power from the sub battery 21.

A smoothing capacitor 26 is connected to the input side of the AC generating circuit 3a (between the AC generating circuit 3a and the main battery 22). The smoothing capacitor 26 is provided to smooth a current to be input to the AC generating circuit 3a. The main battery 22 has an output voltage of 300 V. High currents flow through the main battery 22. Thus, the smoothing capacitor 26 has a capacitance that is larger than the capacitance of a capacitor in a control circuit operated at 5 V, 12 V or the like.

A discharge resistance 25 and a relay 24 are connected to the smoothing capacitor 26 in parallel. The discharge resistance 25 and the relay 24 are connected in series. The discharge resistance 25 is a device (discharge device) that converts electric charge stored in the smoothing capacitor 26 into heat energy to dissipate the hear energy. The discharge resistance 25 is heat-resistant and has a large resistance value. The relay 24 is a switch that connects/disconnects the discharge resistance 25 to/from the smoothing capacitor 26. Although the relay 24 is normally open, the relay 24 is closed when the vehicle stops or when a collision of the vehicle occurs. The inverter control circuit 3b controls opening and closing of the relay 24.

Next, an electrical system for the sub battery 21 is described. The sub battery 21 supplies electric power to the pump inverter 12 and the inverter control circuit 3b. The sub battery 21 also supplies electric power to the vehicle controller 15. However, a power supply line extending from the sub battery 21 to the vehicle controller 15 is not shown in FIG. 1. A voltage sensor 23 is provided on the electric-power input side of the inverter control circuit 3b. Data detected by the voltage sensor 23 is transmitted to the vehicle controller 15. That is, the vehicle controller 15 monitors a voltage that is input to the inverter control circuit 3b.

The pump inverter 12 is dependent on the sub battery 21 for both electric power used to drive the motor of the pump 6 and electric power used to drive a control circuit in the pump inverter 12. That is, in a steady state, the pump inverter 12 converts DC power of the sub battery 21 into AC power to supply the AC power to the AC motor of the pump 6. A relay 17 that connects and disconnects the sub battery 21 and the pump inverter 12 to and from each other is interposed between the sub battery 21 and the pump inverter 12. Although the relay 17 is normally closed (connects the sub battery 21 and the pump inverter 12 to each other), the relay 17 is open when a main switch (not shown) of the vehicle is switched OFF or when a collision of the vehicle occurs. That is, the sub battery 21 and the pump inverter 12 are disconnected from each other. The vehicle controller 15 controls opening and closing of the relay 17.

An emergency capacitor 14 and a relay 13 are connected to the DC input side of the pump inverter 12. The relay 13 is a switch that switches between connection and disconnection of the emergency capacitor 14 to and from the pump inverter 12. The relay 13 is open while the vehicle is running normally (the emergency capacitor 14 is disconnected from the pump inverter 12). The relay 13 is closed when the main switch of the vehicle is switched OFF or when a collision of the vehicle occurs. That is, the emergency capacitor 14 is connected to the pump inverter 12. The vehicle controller 15 controls the relay 13. Reference numeral 16 in FIG. 1 denotes an acceleration sensor provided in an air-bag system. When the acceleration sensor 16 detects a preset magnitude of acceleration, the acceleration sensor 16 informs the vehicle controller 15 that the preset magnitude of acceleration has been detected. That is, a signal of the acceleration sensor 16 corresponds to a signal indicating a collision of the vehicle.

Controlling the emergency capacitor 14 by the vehicle controller 15 and advantages of the emergency capacitor 14 are described. When the main switch of the vehicle (a switch typically referred to as "ignition switch") is switched from ON to OFF while the vehicle is running, the vehicle controller 15 opens the relay 17 and shuts off a supply of electric power to the pump inverter 12. That is, a supply of electric power to the pump 6 is shut off. After the main switch is switched OFF, a supply of electric power to the pump 6 is stopped. However, because the vehicle has been running until immediately before switching-OFF of the main switch, a cooling medium is still circulated through the cooling-medium flow path 4, and the pump 6 is driven in the reverse direction due to an inertial force of the continuously-flowing cooling medium. Therefore, the pump 6 the pump motor) generates a counter electromotive force. The counter electromotive force causes the pump 6 to generate an alternating current. In this case, the vehicle controller 15 closes the relay 13 (that is, the emergency capacitor 14 is connected to the pump inverter 12), while providing a switching command to a switching circuit of the pump inverter 12 to convert the alternating current generated by the pump 6 into a direct current. Consequently, the alternating current generated by the pump 6 is absorbed by the emergency capacitor 14. That is, the AC power generated due to the counter electromotive force generated by the pump 6 is converted into a DC power by the pump inverter 12 to store the direct current in the emergency capacitor 14. In other words, the vehicle controller 15 controls the pump inverter 12 such that the counter electromotive force generated by the pump 6 is converted into DC power to output the DC power to the emergency capacitor 14. In a steady state, the emergency capacitor 14 is disconnected from the pump inverter 12, and accordingly does not store electric charge. In addition, in a steady state, the pump inverter 12 converts DC power of the sub battery 21 into AC power to supply the AC power to the AC motor of the pump 6. The alternating current generated by the pump 6 is absorbed by the emergency capacitor 14 in the manner described above, thereby avoiding the pump 6 itself from being damaged by its counter electromotive force.

When a collision of the vehicle occurs, the pump 6 can also generate a counter electromotive force, as described in the above case. When the vehicle controller 15 receives a signal indicating a collision of the vehicle from the acceleration sensor 16, the vehicle controller 15 performs the same processing as when the main switch is switched OFF. That is, the vehicle controller 15 controls the relay 13 and the pump inverter 12 to store a current generated due to the counter electromotive force of the pump 6 in the emergency capacitor 14. In other words, when a controller that controls the pump receives a signal indicating a collision of the vehicle, the controller stops a supply of electric power to the pump and connects the emergency capacitor to the pump inverter that drives the pump. The pump inverter converts AC power generated due to the counter electromotive force of the pump into DC power to store the DC power in the capacitor.

When the vehicle controller 15 receives a signal indicating a collision of the vehicle, the vehicle controller 15 monitors the voltage of the voltage sensor 23 and checks whether electric power is supplied from the sub battery 21 to the inverter control circuit 3*b*. When a value of the voltage detected by the voltage sensor 23 is not large enough to drive the inverter control circuit 3*b*, that is, when sufficient electric power is not supplied from the sub battery 21 to the inverter control circuit 3*b*, the vehicle controller 15 closes the relay 17. In other words, when the sub battery 21 is disabled, the vehicle controller 15 closes the relay 17. The electric power stored in the emergency capacitor 14 is then supplied to the inverter control circuit 3*b*, and accordingly the inverter control circuit 3*b* is in an operative state. The vehicle controller 15 transmits a command to the inverter control circuit 3*b* to close the relay 24. The discharge resistance 25 discharges the smoothing capacitor 26.

When a collision of the vehicle occurs, electric charge stored in a smoothing capacitor is preferably discharged. A controller that controls a discharge device (an inverter controller) is operated by power from a battery. However, the controller cannot operate the discharge device if a supply of electric power from the battery is shut off due to the impact of the collision. Therefore, the electric vehicle according to an embodiment of the present invention may further include a discharge device that dissipates electric charge stored in the motor inverter, in which the vehicle controller 15 may operate the discharge device by using electric power stored in the emergency capacitor 14 when the controller receives a signal indicating a collision of the vehicle.

As described above, the electric vehicle 100 according to the present embodiment allows the emergency capacitor 14 to absorb a current caused by a counter electromotive force of the pump 6 that delivers a cooling medium to the motor 7 and the motor inverter 3. In addition, the electric vehicle 100 can operate the discharge device by using electric power stored in the emergency capacitor 14 even when a collision of the vehicle occurs and the sub battery 21 is disabled.

Regarding the present embodiment, the following points should be noted. The discharge device is not limited to the discharge resistance. For example, the AC generating circuit 3*a* in the motor inverter 3 may be preferably utilized as the discharge device. That is, similarly to the technique disclosed in JP 2003-199387 A, the motor inverter 3 itself may be driven to discharge electric charge of the smoothing capacitor 26. In this case, the motor inverter itself corresponds to the discharge device. Alternatively, the switching circuits SW in the AC generating circuit 3*a* may be appropriately driven such that electric power stored in the smoothing capacitor 26 is dissipated by switching losses. In a case where the discharge resistance is employed as the discharge device, the phrase "operates the discharge device" as used herein means that the discharge resistance is corrected to the smoothing capacitor 26. In a case where the motor inverter 3 is employed as the discharge device, the phrase "operates the discharge device" as used herein means that the switching circuits SW in the motor inverter 3 are driven to flow electric charge stored in the smoothing capacitor 26.

The cooling system 100*a* according to the present embodiment cools both the motor inverter 3 and the motor 7. The present invention may also be applied to cooling systems that cool either a motor inverter or a motor. In addition, the vehicle according to the present embodiment is an electric vehicle that includes one motor. However, the present invention may also be applied to hybrid vehicles that include both a motor that drives wheels and an engine.

The descriptions of the present embodiment are for the purpose of explaining the principle of the present invention. Descriptions on several elements necessary for the vehicle system to completely operate are omitted. For example, the vehicle controller 15 may include therein a capacitor that stores electric power such that the vehicle controller 15 can be operated even when a collision of the vehicle occurs and the sub battery 21 is disabled. Alternatively, the vehicle controller 15 may include a backup battery. Further alternatively, there may be a case where a voltage regulator is necessary for driving the inverter control circuit 3*b* by using electric power stored in the emergency capacitor 14. Descriptions on the backup battery, the voltage regulator, and so on are herein omitted. Those skilled in the art who have read this specification can easily understand these components.

While specific examples of the present invention have been described above, these examples are merely for illustrative purposes and not intended to limit the claims. The techniques described in the claims include various modifications of the specific examples described above. The technical elements described herein or illustrated in the drawings demonstrate technical utility when used singly or in various combinations, and the combinations of the technical elements are not limited to those described in the original claims. Moreover, the techniques described herein or illustrated by way of example in the drawings are intended to simultaneously achieve a plurality of purposes, and have technical utility by achieving one of the purposes.

What is claimed is:

1. An electric vehicle comprising:
   a motor inverter that supplies electric power to a wheel-driving motor, the motor inverter having a smoothing capacitor;
   a pump that delivers a cooling medium to at least one of the motor inverter and the wheel-driving motor;
   a storage capacitor that stores a counter electromotive force generated by the pump;
   a pump inverter that supplies electric power to the pump to drives the pump; and
   a controller that is configured to stop a supply of electric power from the pump inverter to the pump and connect the pump inverter to the storage capacitor when the controller receives a signal indicating a collision of the vehicle.

2. The electric vehicle according to claim 1, further comprising:
   a cooling medium flow path on which at least one of the motor inverter and the wheel-driving motor is provided,
   wherein the pump circulates the cooling medium in the cooling medium flow path.

3. The electric vehicle according to claim 1, further comprising;
   a discharge device that dissipates electric charge stored in the motor inverter,
   wherein the controller operates the discharge device by using electric power stored in the storage capacitor when the controller receives a signal indicating a collision of the vehicle.

4. The electric vehicle according to claim 3, wherein the controller operates the discharge device by using electric power stored in the storage capacitor when a battery that operates the discharge device is disabled.

* * * * *